(12) United States Patent
Hilleary

(10) Patent No.: US 6,369,704 B2
(45) Date of Patent: *Apr. 9, 2002

(54) METHOD AND APPARATUS FOR LIGHT OUTAGE DETECTION

(75) Inventor: Thomas N. Hilleary, Chesterfield, MO (US)

(73) Assignee: LaBarge, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/800,808

(22) Filed: Mar. 7, 2001

Related U.S. Application Data

(63) Continuation-in-part of application No. 09/585,185, filed on Jun. 1, 2000, now Pat. No. 6,222,446.

(51) Int. Cl.[7] .............................................. B60Q 11/00
(52) U.S. Cl. ........................ 340/458; 340/691; 315/132; 246/125; 246/473 R
(58) Field of Search ................................ 340/458, 931, 340/981, 641; 315/132; 246/125, 473 R

(56) References Cited

U.S. PATENT DOCUMENTS

| 4,518,963 A | * | 5/1985 | Rogers, Jr. ................. 340/981 |
| 5,022,613 A | * | 6/1991 | Peel .......................... 246/125 |
| 6,222,446 B1 | * | 4/2001 | Hilleary ...................... 340/458 |

* cited by examiner

Primary Examiner—Edward Lefkowitz
(74) Attorney, Agent, or Firm—Armstrong Teasdale LLP

(57) ABSTRACT

One embodiment of the present invention is a system for monitoring failure of a signal having lighting configured to indicate a predetermined alarm condition. The system includes a detector/transmitter responsive to lighting parameters at least during the predetermined alarm condition to generate a signal indicative of the lighting parameters; an attachment member configured to attach the detector/transmitter to a lamp socket of the lighting in an orientation in which the detector/transmitter assembly is responsive to light rays from a lamp mounted in the lamp socket when the lamp is on; and a receiver/concentrator responsive to the signal indicative of the lighting parameters to generate a signal indicative of predetermined fault conditions of the lighting.

29 Claims, 4 Drawing Sheets

METHOD AND APPARATUS FOR LIGHT OUTAGE DETECTION

CROSS REFERENCE TO RELATED APPLICATIONS

This application is a continuation-in-part of U.S. Pat. application Ser. No. 09/585,185, filed Jun. 1, 2000, now U.S. Pat. No. 6,232,446, entitled "Method and Apparatus for Light Outage Detection," which is hereby incorporated by reference in its entirety.

BACKGROUND OF THE INVENTION

This invention relates generally to methods and apparatus for detection of signal light parameters, and more particularly to methods and apparatus for detecting and reporting signal light failures occurring at remote locations.

Railroads are now utilizing remote monitoring of signal locations as a tool for more rapid diagnosis of signaling problems. When such problems are promptly corrected, improved efficiency and safety of operations results.

Current methods of monitoring flashing warning lights in railroad applications are labor intensive to install and to calibrate, and do not provide a reliable, unambiguous, long-term indication of lamp performance.

One condition presently monitored at signal locations is the presence of AC power. Although backup battery systems are often employed, battery power is sometimes exhausted before AC power is restored and before maintenance personnel are alerted to the problem. To reduce the likelihood of this occurrence, backup battery systems having large reserve capacity are used. However, if an outage is persistent and goes undetected, as for example, when there is an open circuit breaker at the signal location, the first indication of trouble may occur only when the signal location is altogether nonfunctional. Timely reporting of AC power outages would help avoid such delays.

Techniques most often employed to report AC power outages measure bulk current through primary conductors supplying external lamps, and draw inferences to determine an exact number of bulbs that are operating correctly. These circuits are highly sensitive and the current detection components themselves (Hall effect devices) are prone to aging drift and nonlinearity.

Additional measures have been taken to alleviate problems associated with extended loss of AC power at highway crossings. For example, crossings are designed with separate operating battery and control battery systems. The battery systems have different capacities, so that, when AC power is lost, the operating battery is depleted first. The highway crossing is configured so that, upon depletion of the operating battery, the crossing is activated continuously. Ideally, the crossing will be reported as malfunctioning before the control battery is also depleted. Active crossings are also provided with indicator lights that are continuously lit when AC power is available. Employees are instructed to report an AC power off condition immediately to a dispatcher when they observe that the indicator lamps are off. Equipment houses at active crossing locations are also labeled with site-specific information and a toll-free telephone number that can be used by the public for reporting crossing problems.

Even with measures now in place, however, the reporting of crossing problems is still primarily a manual process, with inherent inaccuracies and delays. It would be desirable if these inaccuracies and delays could be reduced or eliminated. Moreover, many other crossing conditions, such as battery voltages and lamp currents, and for highway crossings, gate operation and activation status, are of interest and should be monitored. It has been difficult, however, to obtain timely reports of these conditions from remote locations.

The problems of reporting outages are not limited to railroad crossings. For example, it would also be helpful if outages could be reported on a timely basis from other warning systems, such as tower and building obstruction lighting, exit signs, traffic signals, and other warning devices. Not all of these devices blink to report a warning condition, and in some, lighting must be on at all times.

BRIEF SUMMARY OF THE INVENTION

There is therefore provided, in one embodiment of the present invention, a system for monitoring failure of a signal having lighting configured to indicate a predetermined alarm condition. The system includes a detector/transmitter responsive to lighting parameters at least during the predetermined alarm condition to generate a signal indicative of the lighting parameters; an attachment member configured to attach the detector/transmitter to a lamp socket of the lighting in an orientation in which the detector/transmitter assembly is responsive to light rays from a lamp mounted in the lamp socket when the lamp is on; and a receiver/concentrator responsive to the signal indicative of the lighting parameters to generate a signal indicative of predetermined fault conditions of the lighting.

DETAILED DESCRIPTION OF THE INVENTION

Figure 1:
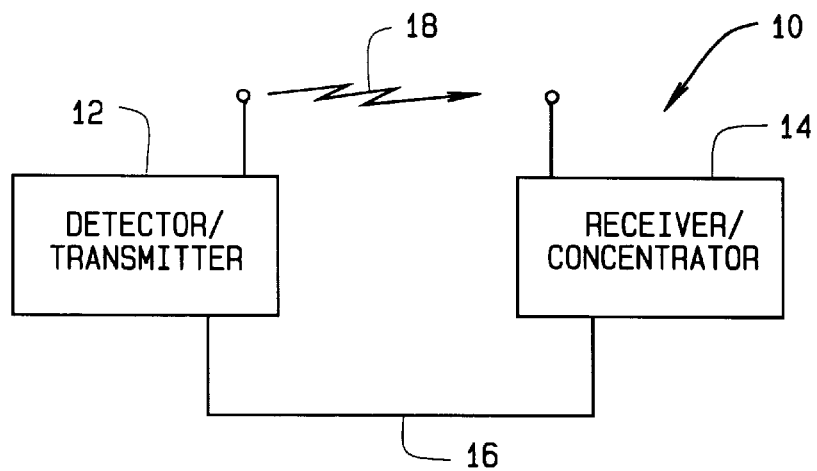
FIG. 1 is a simplified block diagram of one embodiment of a light outage detection system of the present invention.

In one embodiment, and referring to FIG. 1, a light outage detection system 10 has two main component systems. The first is a detector/transmitter 12 that detects one or more lighting parameters such as brightness or intensity, lamp head voltage, and flash rates of lamps in a lamp head. The second is a central receiver/concentrator 14 to which information relating to the lighting parameters is sent for analysis of possible alarm conditions. In one embodiment, a receiver/concentrator 14 receives lighting parameter information from up to six detector/transmitters 12 and each detector/transmitter 12 monitors up to four separate lights. The number of detector/transmitters 12 monitored by a receiver/concentrator 14 and the number of lights monitored by each detector/transmitter 12 differ in other embodiments. Most typically, the lights being analyzed are flashing lights, so that lighting parameter information relating to performance data is sent following each flash cycle. In one embodiment, this information is sent via spread spectrum communication, and is transmitted, for example, on power lines 16 for the flashing lights themselves, or as a field radiated signal 18 (i.e., a radio frequency [RF] signal).

Figure 2:
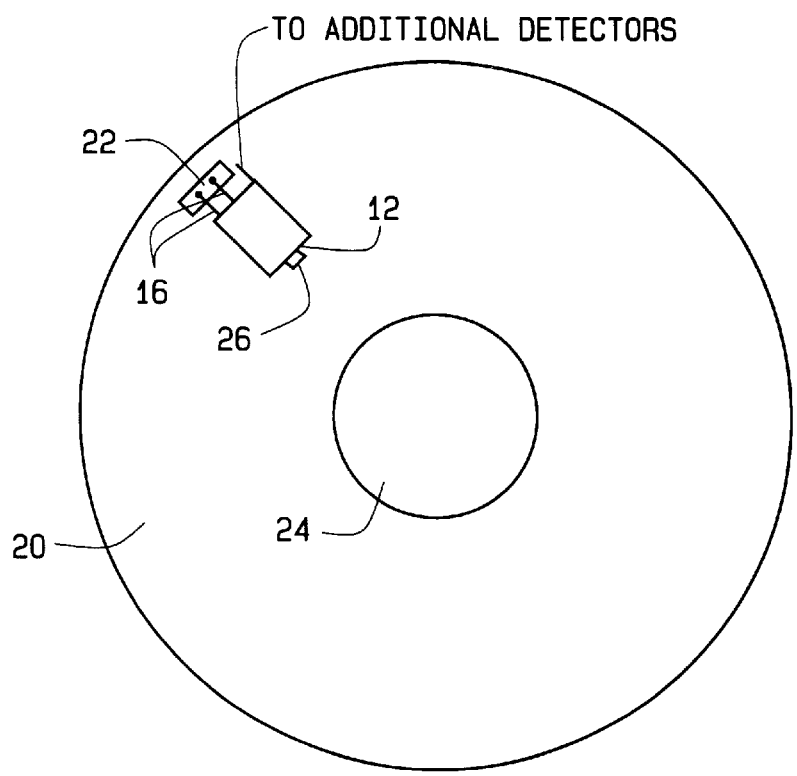
FIG. 2 is a drawing of a flasher lamp showing mounting of one embodiment of a detector/transmitter thereon.

A typical installation of one embodiment of the present invention is as a light outage detector on a railroad grade crossing signal. In one embodiment and referring to FIG. 2, a detector/transmitter assembly 12 is a small, credit-card sized device 13 mounted in a lamp head reflector 20, on a two-screw terminal block 22 that interfaces field wiring 16 between a signal bungalow and one or more incandescent or LED lamps 24 located in lamp head 20. A photodiode or other optical detector 26 of detector/transmitter 12 is configured to receive and detect light directly from lamp 24. In this embodiment, the lighting includes a plurality of lamps 24 configured to flash during a signaling event, and detector/transmitter 12 is configured to be responsive to lighting parameters of at least some of the plurality of lamps 24. For example, three additional flashing lamps (not shown) on the same structure are sensed as well. For example, optical light guide (not shown) interface detector/transmitter 12 to adjacent bulbs (also not shown), or additional, multiplexed photodiodes 28 (shown in FIG. 3) are interfaced to adjacent bulbs. In one embodiment, multiple lamps 24 are located in lamp heads 20, and separate optical detectors 26 are provided for each lamp 24 in a lamp head 20. In this manner, one detector/transmitter monitors light output at a total of four lamp heads 20 on a single pole.

Calibration is accomplished by activating the lamps 24, which causes all detector/transmitters to receive power in parallel with lamps 24 that are being powered. During each flash cycle, every detector/transmitter 12 measures and transmits status, intensity, and voltage level of a lamp 24 or lamps that it is monitoring to receiver/concentrator 14.

Figure 3:
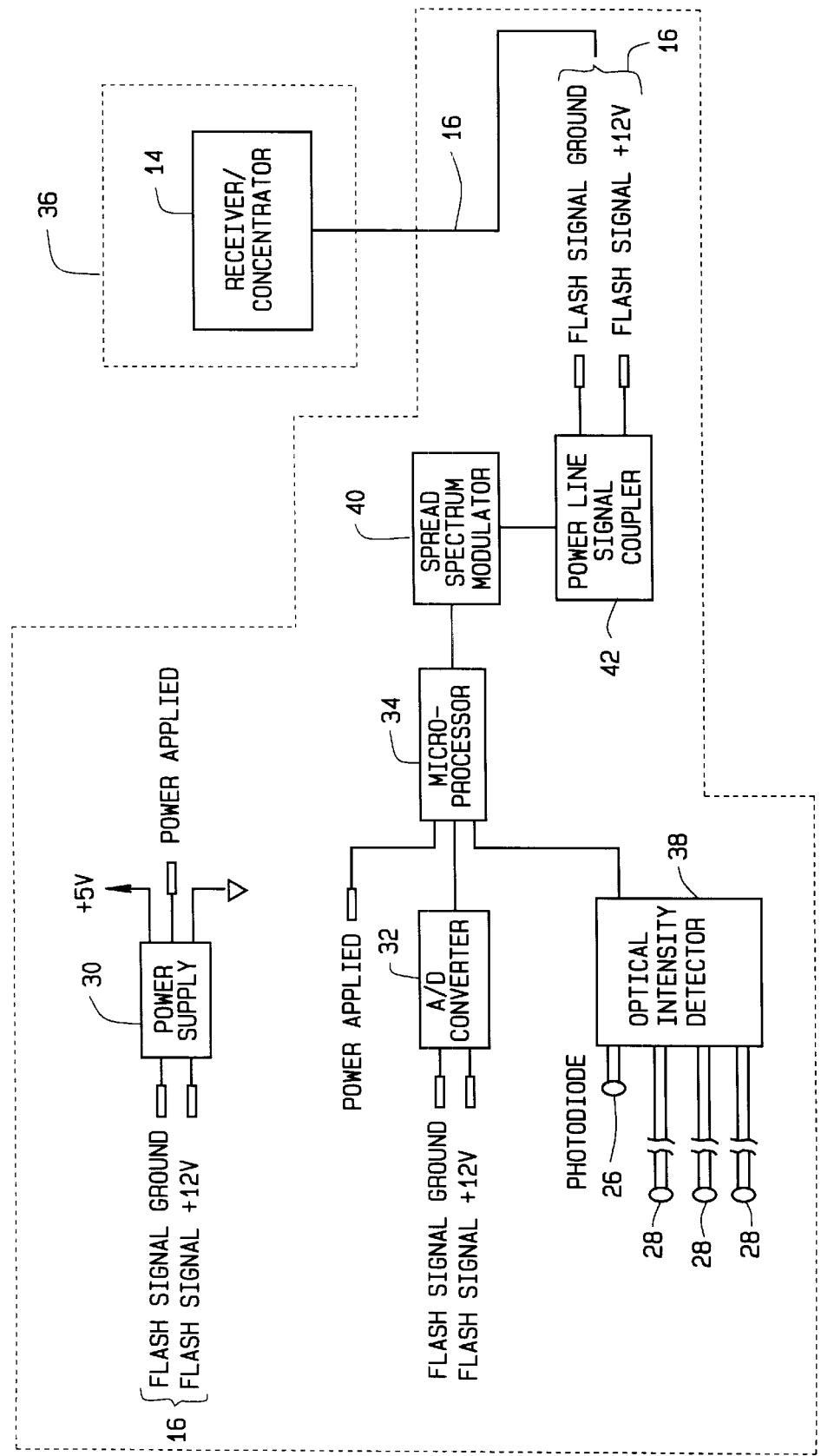
FIG. 3 is a block diagram of one embodiment of a light outage detection system, showing additional details of the detector/transmitter.

Referring to FIG. 3, during a predetermined alarm condition, such as an approach of a train (resulting in activation of the railroad grade crossing signal), a power supply block 30 converts the flashing 12 volt supply that is delivered to individual lamps 24 when the crossing is activated to a constant 5 volt signal that is used to power detector/transmitter 12. Thus, no additional power source other than the flashing 12 volt supply that is normally present is required to power detector/transmitter 12. In addition, for synchronization purposes, power supply block 30 provides a timing signal ("power applied") that indicates when power is or is not being applied to lamps 24. This timing signal is used to synchronize times during which the detector function within detector/transmitter 12 is used to verify that lamps 24 are on, and to synchronize times to sense the lamp head voltage.

When power supply block 30 indicates that voltage is present, an analog to digital converter (ADC) block 32 digitizes a measurement of the voltage and communicates this measurement to a microprocessor block 34. Microprocessor block 34 formats and delivers the measurement information to a receiver/concentrator 14 located at signal bungalow 36 controlling the crossing facility. In one exemplary embodiment, ADC 32 voltage measurement has a resolution of 8 bits.

Microprocessor block 34 receives lamp intensity information from an optical intensity detector 38 monitoring up to four lamps 24, along with voltage at a physical/electrical terminal strip interface point from ADC 32. This information is converted into a suitable form for delivery to receiver/concentrator 14. For example, the information is converted into a serial bit stream and transmitted via field signal wiring 16 or radiated via an RF signal 18. In one embodiment, a spread-spectrum modulator/demodulator 40 (for example, an INTELLON® SSC P200 available from Intellon, Inc., Ocala, Fla.) is used to transmit the information via the field signal wiring 16 to receiver/concentrator 14. In another embodiment, a spread spectrum modulator/demodulator 40 is used in conjunction with a low power RF generator (not shown) for wireless transmission. Flash rate is also determined and included in the message along with a unique detector/transmitter 12 identification number. In embodiments in which more than one lamp 24 is being monitored, a lamp position number (LPN) is also included in the message. Thus, sufficient information is provided for receiver/concentrator 14 is able to determine how many and which, if any, lamps 24 are malfunctioning.

In an embodiment in which information is transmitted via field signal wiring 16 to receiver/concentrator 36, the "power applied" signal from power supply block 30 is used by microprocessor block 34 to time delivery of information to coincide with the voltage present state, to ensure that a metallic path exists back to receiver/concentrator 14. Signal coupler block 42 comprises circuitry to couple transmissions from spread spectrum modulator 40 onto field signal wiring 16 for delivery to receiver/concentrator 14.

Figure 4:
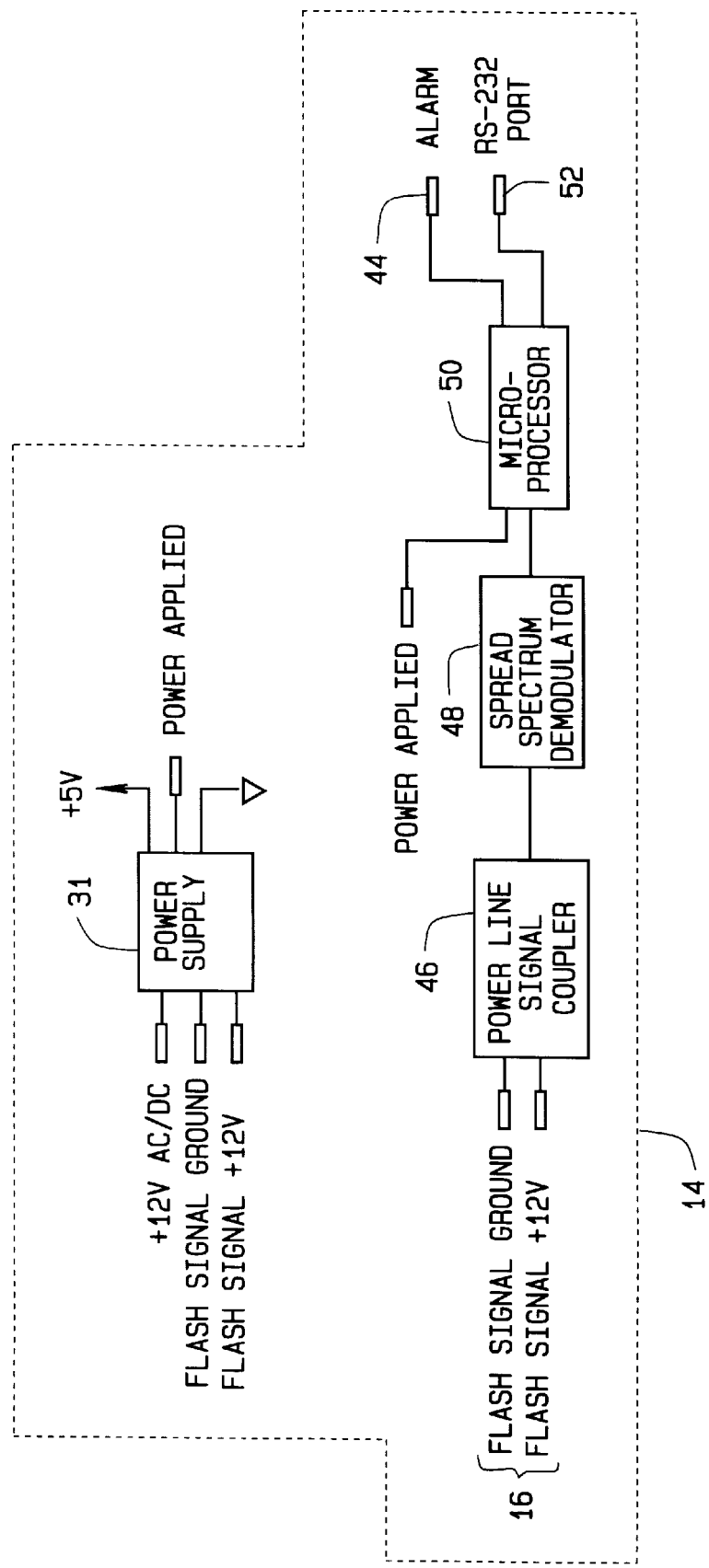
FIG. 4 is a more detailed block diagram of one embodiment of the receiver/concentrator shown in FIG. 3.

Referring to FIG. 4, receiver/concentrator 14 receives an asynchronous message burst each flash cycle from all monitored active detector/transmitters 12. If receiver/concentrator 14 expects but does not receive lighting parameter information affirming that illumination, flash rate, and lamp head voltage are within preselected limits, it delivers an alarm signal 44 to an external alarm communication device (not shown). If a power applied signal is present but receiver/concentrator 14 receives no incoming information affirming the illumination and flash rate status of connected lamps 24, then receiver/concentrator 14 delivers an alarm signal 44 to the external alarm communication device. Alarm signal 44 is thus indicative of predetermined fault conditions of the lighting.

A power supply block 31 provides a constant 5 volt DC voltage to power receiver/concentrator 14. In addition, an input from a flashing relay (not shown) provides power supply block 30 with timing information to produce a "power supplied" signal that is used to synchronize microprocessor block 48 of receiver/concentrator 14, and to synchronize transmissions from a number of detector/transmitters 12.

In one embodiment, a power line signal coupler 46 of receiver/concentrator 14 contains circuitry configured to couple a lighting parameter information signal on field signal wiring 16 to a demodulator 48. (In embodiments in which an RF signal 18 is transmitted, couplers 42 and 46 are replaced by an RF transmitter and receiver [not shown], respectively.)

In one embodiment, an INTELLON® SSC P200 spread spectrum modulator/demodulator 48 is used to demodulate a spread spectrum signal delivered via field signal wiring 16 to receiver/concentrator 14. Using a "power applied" signal from power supply block 31, a microprocessor block 50 is synchronized with incoming serial data. The use of a spread spectrum signal and multiple repetitions of serial information in one embodiment ensures that microprocessor block 50 experiences a high success rate in sorting and correctly receiving asynchronous data from a number of different detector/transmitters 12.

Microprocessor block 50 receives and interprets incoming serial asynchronous data from a number of detector/ transmitters 12. In one embodiment, upon initialization, receiver/concentrator 14 dynamically takes inventory of lamps 24 that are activated, based upon signals received from detector/transmitters 12. In this manner, receiver/concentrator 14 is able to "remember" what lamps 24 should be active when the crossing is active. When at least one lighting parameter such as flash rate or lamp head voltage is outside predetermined values, or when an insufficient number or an unacceptable combination of lamps 24 are operating, microprocessor block 50 delivers an alarm signal to an external alarm communication device. Microprocessor block 50 also includes a communication port 52 (for example, a serial port) configured for communication with an external device, such as a laptop computer (not shown). Microprocessor block 50 is configured to provide the current status of all lamps, flash rates, and voltages to the external device through communication port 52 so that this information can be displayed, such as on a graphic user interface application running on the laptop computer. Because of the multiplicity of lamps 24 in a crossing warning device, and/or a multiplicity of lamps 24 in a single lamp head 20, a successful warning event may be considered to have occurred despite one or more lamp 24 failures. Therefore, in one embodiment, microprocessor block 50 is configured to receive information relating to the numbers or combinations of operating lamps required to comprise a successful crossing warning event via communication port 52, thereby providing adjustment of thresholds for triggering warnings or failure indications as desired.

Memory (not separately shown in FIG. 4) associated with microprocessor block 50 is provided to archive crossing activation performance data, including, but not necessarily limited to, triggering warnings and failure indications. (For example, failures of individual lamps 24 even during warning indications meeting the threshold for a successful event are recorded in one embodiment.) This archived data is accessible via communication port 52, so that a user is able to diagnose past crossing activation performance.

Figure 5:
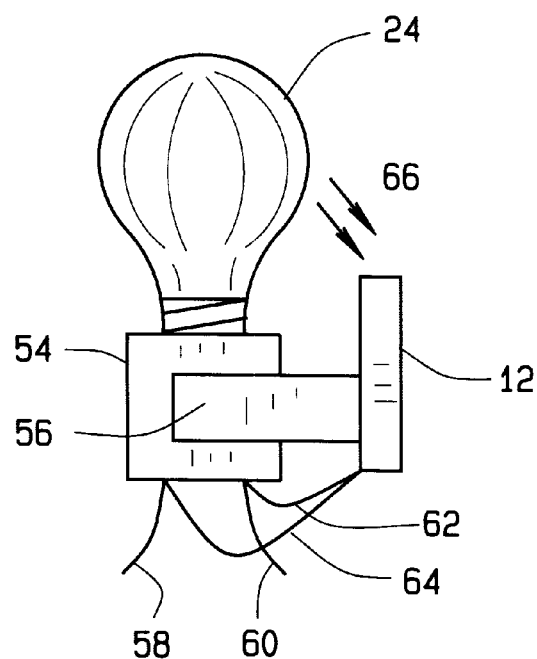
FIG. 5 is a drawing of a socket clamp mounted detector/transmitter assembly of one embodiment of the present invention.

In one embodiment and referring to FIG. 5, a detector/transmitter 12 is mounted on an attachment member 56, which in turn is mounted on a lamp socket 54. Attachment member 56 configured to attach onto lamp socket 54 in an orientation in which detector/transmitter 12 is responsive to light rays 66 from lamp 24 when lamp 24 is on. For example, in one embodiment, attachment member 56 is a circular clamp configured to clamp onto an outside portion of lamp socket 54, and detector/transmitter 12 is housed in or otherwise attached to or mounted on clamp 56, such as at a flange of clamp 56. A pair of electrical conductors or wires 62, 64 from detector/transmitter 12 are electrically connected with terminals or conductors 58, 60 that supply power to lamp 12 at socket 54, thereby providing power to detector/transmitter 12. Conductors 62, 64 also provide a communication path from detector/transmitter 12 to a receiver/concentrator 14 (not shown in FIG. 5).

Figure 6:
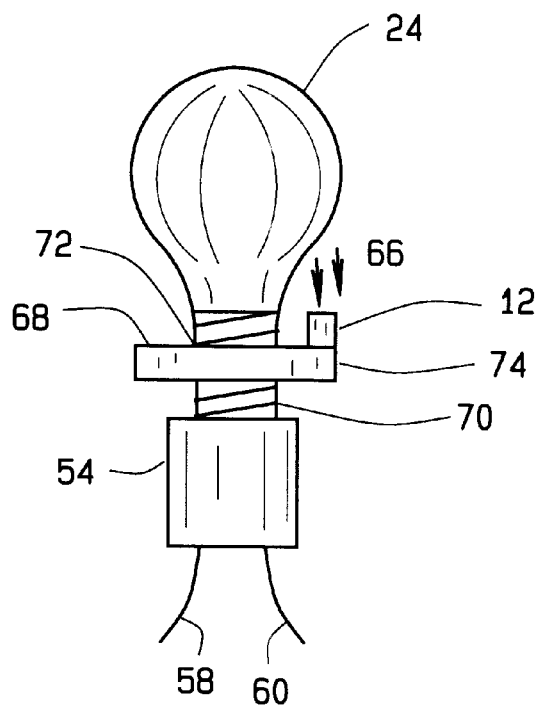
FIG. 6 is a drawing of a nested socket detector/transmitter assembly of one embodiment of the present invention.

In one embodiment and referring to FIG. 6, a nested socket arrangement is provided for detector/transmitter 12. An adapter 68 houses detector/transmitter 12 on a flange 74 or on another portion of adapter 68 in an orientation in which detector/transmitter 12 receives light rays 66 from lamp 24 when lamp 24 is screwed into a socket 72 of adapter 68. Adapter 68 itself in one embodiment has a base 70 that is inserted into, and replaces lamp 24 in lamp socket 54. The lamp is then inserted into adapter 68. For example, base 70 is threaded and screws into lamp socket 54, and lamp 24 screws into adapter 68. When lamp socket 54 is energized, power is supplied both to lamp 24 and to detector/transmitter 12 on adapter 68. A communication path for detector/transmitter 12 is provided through lamp socket 54 and conductors 58 and 60 in this embodiment.

Embodiments of the present invention utilizing flashing lamps in railroad applications are described above, but the invention is useful in other environments as well. For example embodiments of the invention can be used to detect outages when lamps 24 are used in flashing obstruction lighting such as that used on towers or buildings.

In other embodiments, monitored lamps do not or need not flash, or may indicate an alarm or signaling condition by turning on and remaining on for some period of time. For example, one embodiment of the present invention is useful for monitoring lamps 24 in standard highway traffic signals, in which lamps are switched on and off to signal alarm (i.e., traffic) conditions, but do not necessarily flash to do so. In other embodiments, outages are detected in lights that are (or at least are intended to be) constantly on, such as lamps 24 in building exit signs or outdoor illuminated signage. (For illuminated signage, an "alarm" or "signaling condition" is deemed to occur whenever the signage is illuminated.) In these embodiments, detector/transmitter 12 derives its power from the lamp circuit, and thus sends a signal to receiver/concentrator 14 whenever detector/transmitter 12 is receiving power, but cannot confirm that lamp 24 is illuminated. A timing circuit (not shown) is provided in one embodiment to ensure that lamps 24 requiring a period of time to turn on (such as mercury vapor lamps) are not determined to be failed during a warm-up period. In one embodiment, the timing circuit is provided in detector/transmitter 12 to inhibit transmission of a signal indicative of lighting failure of a lamp 24 by a detector/transmitter 12 sensing light from lamp 24 until a predetermined period of time has elapsed after power has been applied to lamp 24. In another embodiment, the delay circuit is provided in receiver/concentrator 14.

In one embodiment, receiver/concentrators 12 are installed in a traffic signal or other signaling device in which only one or a predetermined number or combination of lamps 24 are to be illuminated at any given time or in any given sequence. In this embodiment, receiver/concentrator 14 receives signals from a plurality of detector/transmitters 12 configured to detect lighting at different lamps 24 of the signaling device and to transmit different unique identification numbers to receiver/concentrator 14. Receiver/concentrator 14 is configured (for example, using logic circuitry or a microprocessor) to detect an anomalous signaling condition of lamps 24 using signals received from detector/transmitters 12 indicating the state of monitored lamps 24 and the unique identification numbers of detector/transmitters 12. Anomalous signaling conditions refer to deviations from a set of predetermined states of the signaling device. Examples of such predetermined states for a traffic signal include those states having single lamps 24 lit in each direction that signal nonconflicting traffic patterns. Examples of anomalous signaling conditions of a traffic signal include conditions in which there is no lighted lamp visible in one or more directions, simultaneous red and green signal in one direction, or simultaneous green signals for cross streets at intersections. Full sets of allowable, predetermined states and of anomalous conditions are readily determinable in most cases. However, embodiments of the present invention that detect fewer than all possible or all known anomalous signaling conditions are also useful.

Receiver/concentrator 14 in one embodiment receives signals from detector/transmitters 12 in more than one signaling device and is configured to determine the state of each signaling device using the unique identification numbers provided by the detector/transmitter 12 signals. Thus, anomalous signaling conditions can be monitored at more than one signaling device at one time by a single receiver/concentrator.

From the preceding description of various embodiments of the present invention, it is evident that problems inherent in manual reporting of railroad grade crossing problems are reduced and eliminated.

While the invention has been described in terms of various specific embodiments, those skilled in the art will recognize that the invention can be practiced with modification within the spirit and scope of the claims.

What is claimed is:

1. A system for monitoring failure of a signal having lighting configured to indicate a predetermined alarm condition, said system comprising:
    a detector/transmitter responsive to lighting parameters at least during the predetermined alarm condition to generate a signal indicative of the lighting parameters;
    an attachment member configured to attach said detector/transmitter to a lamp socket of the lighting, said attachment member configured to attach to the lamp socket in an orientation in which said detector/transmitter assembly is responsive to light rays from a lamp mounted in the lamp socket when the lamp is on; and
    a receiver/concentrator responsive to said signal indicative of the lighting parameters to generate a signal indicative of predetermined fault conditions of the lighting.

2. A system in accordance with claim 1 wherein said attachment member is a circular clamp configured to clamp to an outside portion of the lamp socket, and said detector/transmitter is mounted on said circular clamp.

3. A system in accordance with claim 2 wherein said circular clamp includes a flange, and said detector/transmitter is housed within said flange.

4. A system in accordance with claim 3 further comprising a pair of electrical conductors configured both to supply power to said detector/transmitter from terminals of said lamp socket and to provide a communication path between said detector/transmitter and said receiver/concentrator.

5. A system in accordance with claim 1 further comprising a pair of electrical connectors configured both to derive power for said detector/transmitter from terminals of said lamp socket and to provide a communication path between said detector/transmitter and said receiver/concentrator.

6. A system in accordance with claim 1 wherein said system is installed on a structure selected from the group consisting of buildings and towers, and the detector/transmitter is configured to detect lighting parameters indicative of operation of obstruction lighting flashing.

7. A system in accordance with claim 1 wherein the lighting parameters comprise power supply voltage and brightness.

8. A system in accordance with claim 1 wherein said lighting parameters include flash rate, said detector/transmitters are configured to determine a flash rate, and signal indicative of the lighting parameters includes said signal being indicative of the determined flash rate.

9. A system in accordance with claim 1 wherein said signal includes a plurality of lamps, and wherein said system comprises a plurality of detector/transmitters, and wherein each said detector/transmitter is configured to provide a unique detector identification to the receiver/concentrator.

10. A system in accordance with claim 1 wherein said system is installed on a railroad grade crossing, the predetermined alarm condition is the approach of a train, and said receiver/concentrator is located in a signal bungalow.

11. A system in accordance with claim 1 wherein said system is configured to confirm that at least one lamp of the lighted signaling device is always on.

12. A system in accordance with claim 11 further comprising a timing circuit configured to prevent determination of said fault condition during a warm-up period of the lamp.

13. A system in accordance with claim 1 wherein said system is mounted on a lighted traffic signal.

14. A system in accordance with claim 1 comprising a plurality of detector/transmitters, each configured to be responsive to lighting parameters of a different lamp of the signal and to transmit a unique identification number to the receiver/concentrator; and wherein said receiver/concentrator is configured to analyze lighting parameter signals and said unique identification numbers to determine anomalous signaling conditions.

15. A system for monitoring failure of a signal having lighting configured to flash during a predetermined alarm condition, said system comprising:
    a power supply configured to power the lighting during the predetermined alarm condition and to provide a timing signal indicative of power being applied to the lighting;
    a detector/transmitter responsive to the timing signal to detect lighting parameters when the lighting is flashed on to generate a signal indicative of the lighting parameters;
    an attachment member on which said detector/transmitter is mounted, said attachment member configured to attach onto a lamp socket in an orientation in which said detector/transmitter assembly is responsive to light rays from a lamp mounted in the lamp socket when the lamp is on; and
    a receiver/concentrator responsive to said signal indicative of the lighting parameters to generate a signal indicative of predetermined fault conditions of the lighting.

16. A system for monitoring failure of a signal having lighting configured to indicate a predetermined alarm condition, said system comprising:
    a detector/transmitter responsive to lighting parameters at least during the predetermined alarm condition to generate a signal indicative of the lighting parameters;
    an attachment member configured to screw into a lamp socket of the lighting and having an adapter socket configured to accept a lamp of the lighting, said adapter socket configured to supply power to the lamp when said lamp socket is powered and to attach said detector/transmitter to a lamp socket of the lighting in an orientation in which said detector/transmitter assembly is responsive to light rays from a lamp mounted in the lamp socket when the lamp is on; and
    a receiver/concentrator responsive to said signal indicative of the lighting parameters to generate a signal indicative of predetermined fault conditions of the lighting.

17. A system in accordance with claim 16 wherein said attachment member comprises a flange, said detector/transmitter is mounted on said flange, and said attachment member is configured to supply power to said detector/transmitter and provide a communication path between said detector/transmitter and said receiver/concentrator when said lamp socket is powered.

18. A system in accordance with claim 17 wherein said communication path is through terminals of the lamp socket.

19. A system in accordance with claim 17 wherein said system is installed on a structure selected from the group consisting of buildings and towers, and the detector/transmitter is configured to detect lighting parameters indicative of operation of obstruction lighting flashing.

20. A system in accordance with claim 17 wherein said system is installed on a railroad grade crossing, the predetermined alarm condition is the approach of a train, and said receiver/concentrator is located in a signal bungalow.

21. A system in accordance with claim 17 wherein said system is configured to confirm that at least one lamp of the lighted signaling device is always on.

22. A system for monitoring failure of a signal having lighting configured to indicate at least one predetermined signaling condition, said system comprising:

a plurality of detector/transmitters responsive to lighting parameters at least during the predetermined alarm condition to generate signals indicative of the lighting parameters;

an attachment member for each said detector/transmitter, said attachment member configured to attach said detector/transmitter to a lamp socket of the lighting, and to attach to the lamp socket in an orientation in which said detector/transmitter assembly is responsive to light rays from a lamp mounted in the lamp socket when the lamp is on; and a receiver/concentrator responsive to said signal indicative of the lighting parameters to generate a signal indicative of predetermined fault conditions of the lighting;

wherein said signal comprises a plurality of lamps and said system comprises a plurality of said detector/transmitters, and wherein each said detector/transmitter is configured to provide a unique detector identification number to the detector/transmitter and an identification of a position of each lamp monitored by said detector/transmitter.

23. A system in accordance with claim 22 wherein said system is configured to confirm that at least one lamp of the lighted signaling device is always on.

24. A method for monitoring failure of a signal having lighting configured to indicate a predetermined alarm condition, said method comprising:

attaching a detector/transmitter to a lamp socket in an orientation in which the detector/transmitter assembly is responsive to light rays from a lamp mounted in the lamp socket when the lamp is on;

transmitting a signal indicative of lighting parameters of the lamp and a unique identification number of the detector/transmitter to a receiver/concentrator; and analyzing the signal indicative of the lighting parameters to generate a signal indicative of predetermined fault conditions of the lighting.

25. A method in accordance with claim 24 wherein attaching the detector/transmitter to the lamp socket comprises clamping the detector/transmitter to the lamp socket with a clamp.

26. A method in accordance with claim 24 wherein attaching the detector/transmitter to the lamp socket comprises inserting a nested socket of an adapter housing the detector/transmitter into the lamp socket, and inserting the lamp into the adapter.

27. A method in accordance with claim 24 comprising attaching a plurality of detector/transmitters to a plurality of lamp sockets to monitor a plurality of lamps of the signal and transmitting signals indicative of lighting parameters of each lamp and a unique identification number of each detector/transmitter to a receiver/concentrator;

and wherein analyzing the signal indicative of the lighting parameters to generate a signal indicative of predetermined fault conditions of the lighting comprises analyzing the plurality of signals indicative of the lighting parameters and the unique identification numbers of each detector/transmitter to determine deviations from a set of predetermined states of the signaling device.

28. A method in accordance with claim 24 further comprising delaying generation of the signal indicative of predetermined fault conditions of the lighting for a predetermined period of time.

29. A method in accordance with claim 28 wherein delaying generation of the signal comprises inhibiting transmission of a signal indicative of a lighting failure of a lamp by a detector/transmitter sensing light from the lamp until a predetermined period of time has elapsed after power has been applied to the lamp.

* * * * *